(12) United States Patent
Laliberte

(10) Patent No.: US 7,783,013 B2
(45) Date of Patent: Aug. 24, 2010

(54) METHOD AND SYSTEM FOR ROUTING EMERGENCY COMMUNICATIONS

(75) Inventor: Donald R. Laliberte, Lawrenceville, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1181 days.

(21) Appl. No.: 10/836,741

(22) Filed: Apr. 30, 2004

(65) Prior Publication Data

US 2005/0243973 A1    Nov. 3, 2005

(51) Int. Cl.
H04M 11/00    (2006.01)
(52) U.S. Cl. .......................................... 379/37; 379/45
(58) Field of Classification Search ............. 379/37–51; 455/404.1, 404.2
See application file for complete search history.

(56) References Cited

U.S. PATENT DOCUMENTS

| | | | |
|---|---|---|---|
| 4,935,951 A | 6/1990 | Robinson et al. |
| 4,993,058 A | 2/1991 | McMinn et al. |
| 5,012,507 A | 4/1991 | Leighton et al. |
| 5,161,180 A | 11/1992 | Chavous |
| RE34,677 E | 7/1994 | Ray et al. |
| 5,511,111 A | 4/1996 | Serbetcioglu et al. |
| 5,526,406 A | 6/1996 | Luneau |
| 5,621,379 A | 4/1997 | Collins |
| 5,673,304 A | 9/1997 | Connor et al. |
| 5,724,412 A | 3/1998 | Srinivasan |
| 5,796,806 A | 8/1998 | Birckbichler |
| 5,805,587 A | 9/1998 | Norris et al. |
| 5,883,942 A | 3/1999 | Lim et al. |
| 5,940,474 A | 8/1999 | Ruus |
| 5,940,475 A | 8/1999 | Hansen |
| 6,009,148 A | 12/1999 | Reeves |
| 6,011,473 A | 1/2000 | Klein |
| 6,104,800 A | 8/2000 | Benson |
| 6,144,644 A | 11/2000 | Bajzath et al. |
| 6,208,718 B1 | 3/2001 | Rosenthal |
| 6,208,726 B1 | 3/2001 | Bansal et al. |
| 6,219,413 B1 | 4/2001 | Burg |
| 6,259,692 B1 | 7/2001 | Shtivelman |
| 6,307,920 B1 | 10/2001 | Thomson et al. |
| 6,310,946 B1 | 10/2001 | Bauer et al. |
| 6,343,115 B1 | 1/2002 | Foldare et al. |
| 6,347,136 B1 | 2/2002 | Horan |
| 6,356,756 B1 | 3/2002 | Koster |
| 6,363,065 B1 | 3/2002 | Thornton et al. |
| 6,434,126 B1 | 8/2002 | Park |

(Continued)

OTHER PUBLICATIONS

"Helpless in a 911 Emergency; Some Internet Phone Services Leave Consumers Without a Lifeline," Newsday, Richard J. Dalton, Jr., May 11, 2005, pp. 1-3.

(Continued)

*Primary Examiner*—Stella L Woo
(74) *Attorney, Agent, or Firm*—Myers Bigel Sibley & Sajovec

(57) ABSTRACT

Methods and systems are provided to locate, route, and/or otherwise process an emergency communications signal from a VoIP communication device equipped with a location positioning system and an emergency communications computer software product. The software identifies an emergency communications address, activates the location positioning system, and communicates location coordinates and other emergency information with the emergency communications signal to a communications network.

19 Claims, 8 Drawing Sheets

U.S. PATENT DOCUMENTS

| | | | |
|---|---|---|---|
| 6,476,763 | B2 | 11/2002 | Allen, Jr. |
| 6,480,581 | B1 | 11/2002 | Wa et al. |
| 6,529,500 | B1 | 3/2003 | Pandharipande |
| 6,603,977 | B1* | 8/2003 | Walsh et al. ............. 379/45 |
| 6,614,781 | B1 | 9/2003 | Elliott et al. |
| 6,622,016 | B1 | 9/2003 | Sladek et al. |
| 6,624,754 | B1 | 9/2003 | Hoffman et al. |
| 6,661,785 | B1 | 12/2003 | Zhang et al. |
| 6,665,293 | B2 | 12/2003 | Thornton et al. |
| 6,665,388 | B2 | 12/2003 | Bedingfield |
| 6,665,611 | B1 | 12/2003 | Oran |
| 6,674,745 | B1 | 1/2004 | Schuster et al. |
| 6,678,357 | B2 | 1/2004 | Stumer et al. |
| 6,680,998 | B1 | 1/2004 | Bell et al. |
| 6,703,930 | B2 | 3/2004 | Skinner |
| 6,704,305 | B2 | 3/2004 | Emerson, III |
| 6,718,021 | B2 | 4/2004 | Crockett et al. |
| 6,763,020 | B1 | 7/2004 | Hon |
| 6,771,742 | B2 | 8/2004 | McCalmont et al. |
| 6,792,081 | B1 | 9/2004 | Contractor |
| 6,804,338 | B1 | 10/2004 | Chen |
| 6,842,448 | B1 | 1/2005 | Norris et al. |
| 6,868,074 | B1* | 3/2005 | Hanson ............. 455/456.1 |
| 6,912,399 | B2* | 6/2005 | Zirul et al. ............. 455/463 |
| 6,940,950 | B2 | 9/2005 | Dickinson et al. |
| 7,092,380 | B1 | 8/2006 | Chen et al. |
| 7,257,387 | B2 | 8/2007 | Laliberte |
| 2001/0005372 | A1 | 6/2001 | Cave et al. |
| 2001/0043684 | A1 | 11/2001 | Guedalia et al. |
| 2002/0059374 | A1 | 5/2002 | Nuestro |
| 2002/0065063 | A1* | 5/2002 | Uhlik et al. ............. 455/404 |
| 2002/0065828 | A1 | 5/2002 | Goodspeed |
| 2002/0072348 | A1* | 6/2002 | Wheeler et al. ............. 455/404 |
| 2002/0101860 | A1 | 8/2002 | Thornton et al. |
| 2002/0160745 | A1 | 10/2002 | Wang |
| 2003/0190017 | A1* | 10/2003 | Zellner et al. ............. 379/45 |
| 2003/0211839 | A1 | 11/2003 | Baum et al. |
| 2003/0216148 | A1 | 11/2003 | Henderson |
| 2004/0037403 | A1 | 2/2004 | Koch |
| 2004/0057425 | A1 | 3/2004 | Brouwer et al. |
| 2004/0101123 | A1 | 5/2004 | Garcia |
| 2004/0121782 | A1 | 6/2004 | Tester |
| 2004/0140928 | A1* | 7/2004 | Cleghorn ............. 342/357.07 |
| 2005/0047574 | A1 | 3/2005 | Reid |
| 2005/0063519 | A1 | 3/2005 | James |
| 2005/0070315 | A1 | 3/2005 | Rai et al. |
| 2005/0232243 | A1 | 5/2005 | Adamczyk |
| 2005/0151642 | A1 | 7/2005 | Tupler et al. |
| 2005/0175166 | A1 | 8/2005 | Welenson et al. |
| 2005/0190750 | A1 | 9/2005 | Kafka |
| 2005/0190892 | A1 | 9/2005 | Dawson et al. |
| 2005/0250468 | A1 | 11/2005 | Lu |

OTHER PUBLICATIONS

"Tests Show Many Cellphone Calls to 911 Go Unlocated", The Wall Street Journal, by Anne Marie Squeo, May 19, 2005, pp. 1-3.
FCC to Rule on 911 Access for Web Phones, Washington Post, by Yuki Noguchi, Washington Post Staff Writer, May 18, 2005, pp. 1-3.
BellSouth Clarifies View on VoIP '911' Availability, TR Daily, by Lynn Stanton, May 17, 2005, p. 1.
"Level 3 Communications Sees 911 as its Edge in Internet Telephony", by Heather Draper, Dow Jones Newswires, Jun. 29, 2005, pp. 1-2.
"FCC Addresses VoIP 911 Calls", BellSouth NewsSource from Staff end News Services, by Russell Grantham, May 6, 2005, p. 1.
"AG Files Suit Against Vonage Over '911'", BellSouth NewsSource, by Ted Gotsch, May 5, 2005, pp. 1-2.
"FCC Boss Pushes 911 Plan", BellSouth NewsSource from Staff and News Services, by Renee Degross, Apr. 28, 2005, pp. 1-2.
Bells Ringing In Net Phone 911—CNET News.com by Ben Charny, staff writer, *Daily Clips*, Mar. 7, 2005.
Author Not Available, "VoIP Emergency Calling Services," Intrado Informed Response, 2003 Intrado Inc., Longmont, Colorado, USA.
Author Unknown, "VoIP Patent Applied for," Techweb News.
US 5,905,788, 05/1999, Bauer et al. (withdrawn).
"BellSouthE911 Service Interfaces to Customer Premises Equipment at a Public Safety Answer Point," Technical Reference, Issue 6, TR73528, Apr. 2001.
"The Development of 9-1-1," http://www.sorc911.com/9-1-1-%20History.htm. May 21, 2004.
U.S. Appl. No. 11/089,296.
U.S. Appl. No. 10/024,135, filed Dec. 21, 2001, Ruckart et al.
U.S. Appl. No. 11/318,110, filed Dec. 23, 2005, Lu.
US 5,905,788, 05/1999, Bauer et al. (withdrawn)

* cited by examiner

METHOD AND SYSTEM FOR ROUTING EMERGENCY COMMUNICATIONS

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND OF THE INVENTION

1. Field of the Invention

This invention generally relates to Internet telephony, and, more particularly relates to methods for locating, routing, and/or processing an emergency communication from a Voice-Over Internet Protocol communications device.

2. Description of Related Art

Internet telephony, also referred to herein as Voice-Over Internet Protocol (VoIP), Voice-Over Network (VoN), and/or Internet Protocol Telephony (IP Telephony), is experiencing explosive growth and marked improvements in reliability and sound quality. The improved Internet telephony communications are, in large part, due to upgrading the internet backbone with better switching fabrics, such as Asynchronous Transfer Mode (ATM), and also due to implementation of new communications standards, such as standards for transport protocols, directory services, and/or audio codec format.

Along with these improvements comes new challenges for the industry. For example, a need exists for better, more efficient emergency services in response to an emergency communication from an Internet telephony communications device. When an individual uses a conventional telephone to request an emergency service, such as dialing 9-1-1 to connect with a Public Safety Answering Point (PSAP), the telecommunications network uses network information associated with the communication (e.g., Automatic Number Identification (ANT), Automatic Location Identification (ALI), enhanced 9-1-1 services, and so on) to route the emergency call to a matched Public Safety Answering Point (also referred herein as an "emergency call center" or as PSAP). The emergency call center then uses the network information and/or additional information from a caller to dispatch one or more appropriate emergency service providers. Typically, the emergency service provider is matched with a geographic location, such as a billing address, of the telephone used to dial an emergency phone number to request the emergency service. However, when the caller uses a VoIP phone to request the emergency service, problems exist with routing and with dispatching appropriate emergency service providers. For example, if the caller uses a wireless VoIP communications device, then the wireless VoIP communications device may be used at different geographic locations to make the request for the emergency service, and consequently some network information, like the billing address, is not reliable for routing and/or other processing of the emergency service request to a nearby emergency service provider that is equipped to respond to the emergency request.

The growing popularity of wireless VoIP communications devices brings attention to the above and other emergency communication problems. Accordingly, what is needed are methods and systems for locating, routing, and/or other processing of emergency communications from internet telephony communications devices. Additionally, methods and systems that leverage the abilities of internet telephony communications devices and/or a connected communications network are further needed for these emergency communications.

SUMMARY OF THE INVENTION

This invention addresses the above needs and other needs by providing methods, systems, computer programs, and computer program products to route and/or process an emergency communications signal from an Internet telephony communications device. This invention, in particular, involves a Voice-Over Internet Protocol (VoIP) communication device equipped with a location positioning system and also equipped with an emergency communications computer software product. The emergency communications computer software product (also referred to herein as the "emergency communications module") detects and compares an outgoing communications address with one or more emergency communications addresses stored in an emergency communications profile to determine if the communications address matches an emergency communications address. If the communications address is an emergency communications address, then the emergency communications module activates the positioning system to determine the location coordinates and to associate these coordinates and other information with an emergency communications signal. Thereafter, the emergency communications signal is communicated with a telecommunications network and/or a data network for routing and processing to the emergency communications address, or alternatively, to a public safety answering point (PSAP) associated with the emergency communications signal.

According to embodiments of this invention, a method of processing emergency communications includes receiving a communications address from a VoIP communications device and associating the communications address with an emergency communications address. The method continues if the communications address is an emergency communications address and includes using a positioning system to determine the location co-ordinates of the VoIP communications device, associating the location co-ordinates and an emergency communications profile with an emergency communications signal, accessing emergency data and associating the emergency data with the emergency communication signal, communicating the emergency communications signal to a communications network, and/or connecting the emergency communications signal to a public safety answering point associated with the emergency communications address. When a communications address is detected from the VoIP communications device, the communications address is associated with a database of emergency communications addresses to determine if the communications address is an emergency communications address (e.g., 911, local police, fire, and other emergency service providers). If the communications address matches an emergency communications address, then location co-ordinates (e.g., latitude, longitude) of the VoIP communications device are determined using a positioning system of the VoIP communications device. The location co-ordinates and an emergency communications profile are associated with the emergency communications signal and the emergency communications signal is communicated to a network. The emergency communications profile may include emergency data, an emergency data communications address for accessing the emergency data, and/or one or more emergency communications addresses. The emergency data communications address is accessed to retrieve associated emergency data to communicate with the emergency communications signal. The emergency communications signal may be communicated from the VoIP communications device as well as from an associated communications network to the communications network processing the emergency communications signal to the emergency communications address. The communications network detects, decodes, and matches the location coordinates of the emergency communications signal to a public safety answering point (PSAP) associated with the emergency communications address and connects the emergency communications signal to the PSAP. If the emergency communications address is a user-defined communications address (i.e., the emergency communications address is not a communications address processed to determine the PSAP), then the communications network may not have to match the location coordinates to select a public safety answering point. Rather, the communications network would detect and decode the emergency communications signal and forward the emergency communications signal to the emergency communications address detected from the VoIP communications device.

In further embodiments, the method includes communicating the emergency communications signal to the PSAP via a telecommunications network, a data network, and/or a remote server/database. For example, the associated emergency data may be stored on the remote server/database. Furthermore, when the emergency data is remotely stored, the emergency communications signal including the location coordinates, a linked communications address for accessing the associated emergency data, and the voice communication may be communicated from the VoIP communications device to a telecommunications network for processing to the PSAP. Thereafter, the remote, associated emergency data may be accessed over the linked communications address to the remote server/database, or alternatively, to a data network. Still other embodiments include the above method with alternate communications devices (i.e., communications devices other than a VoIP phone), such as, for example, a personal computer, a laptop, a pager, a personal digital assistant, a musical recording device, a digital signal processor, and an Interactive television.

According to other embodiments of this invention, an emergency communications system includes a communications device with a position locating system and with an emergency communications module stored in memory and includes a communications interface. The emergency communications module includes a computer program product that accesses an emergency communications profile of one or more emergency service communications addresses, emergency data, and/or one or more emergency data communications address for accessing the emergency data. The communications interface communicates an emergency communications signal to a communications network to connect with the emergency communications address, or alternatively, to connect with a PSAP associated by the location coordinates and/or the emergency communications address. The emergency communications signal includes the location co-ordinates, one or more emergency service communications addresses, a communications signal, the emergency data, and one or more emergency data communications addresses for accessing the emergency data. In further embodiments, the system includes a communications network that analyzes the emergency communications signal to select a PSAP, and thereafter, communicates the emergency communications signal to the selected PSAP.

According to additional embodiments of this invention, a computer program product includes a computer-readable medium and an emergency communications module stored on the computer readable medium. The emergency communications module detects an emergency communications address, activates a positioning system to determine location co-ordinates, and associates the location co-ordinates and an emergency communications profile with an emergency communication signal. In further embodiments, the emergency communications module initiates communication of the emergency communication signal to a communications network. Similar to the above embodiments, the emergency communications profile may include emergency data, one or more emergency data communications addresses, and one or more emergency communications address. According to various embodiments, the computer-readable medium may be stored in a VoIP communications device, a personal computer system, a communications network, an alternate communications device, and/or a remote data server.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The above and other embodiments, objects, uses, advantages, and novel features of this invention are more clearly understood by reference to the following description taken in connection with the accompanying figures, wherein.

DETAILED DESCRIPTION OF THE INVENTION

Figure 1:
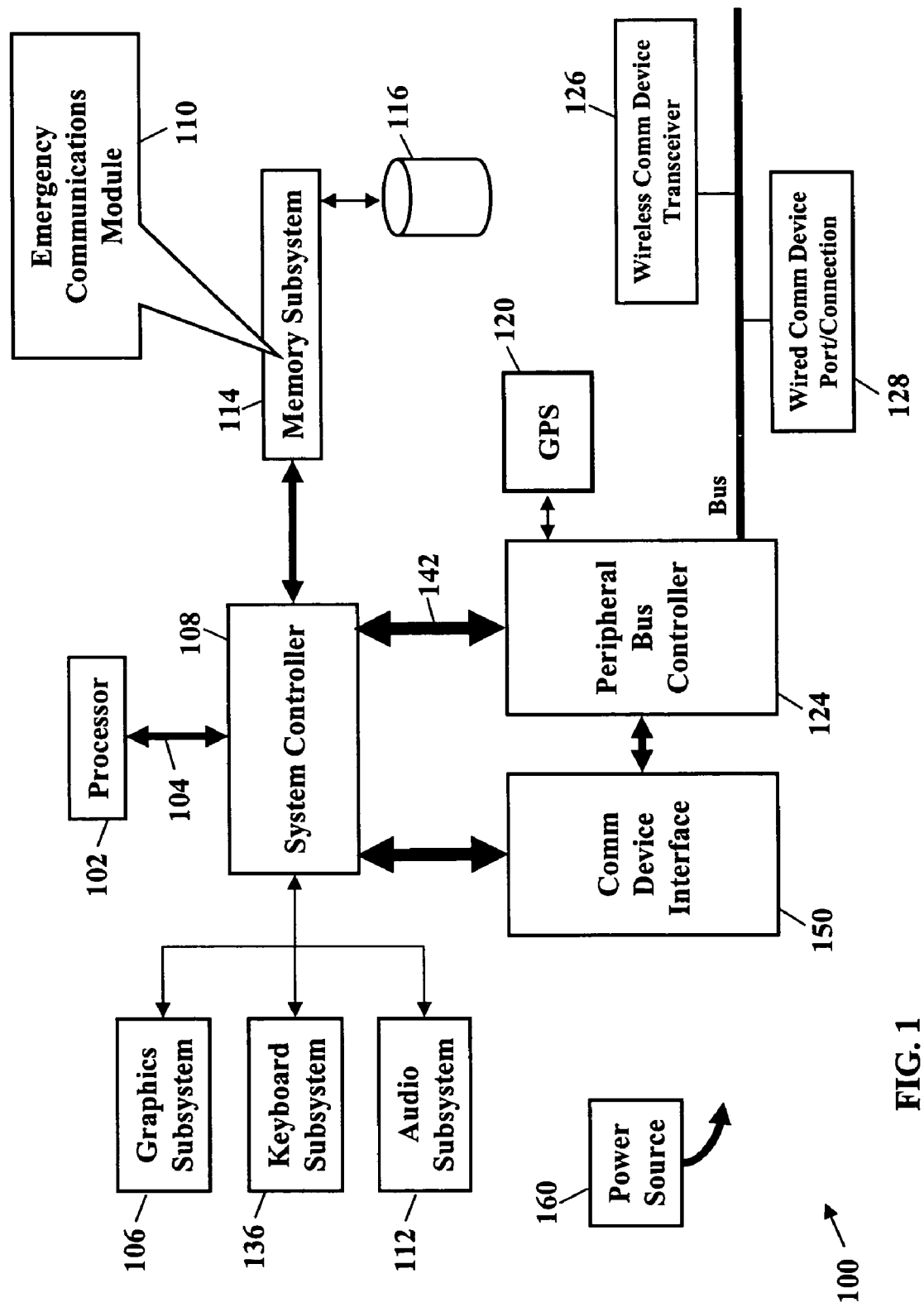
FIG. 1 illustrates a block diagram of an operating system according to the embodiments of this invention.

This invention now will be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, flowcharts, illustrations, and the like represent conceptual views or processes illustrating systems, methods and computer program products embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

This invention provides systems, methods, and computer program products for locating, routing, and/or otherwise processing an emergency communication signal from a VoIP communications device to an emergency communications address. The VoIP communications device is equipped with a location positioning system and an emergency communications module. The emergency communications module detects and compares an outgoing communications address (e.g., a call to a called telephone number or a communication (voice and/or data) to an electronic communications address such as, for example, an IP address, a URL address, or an email address) with one or more emergency communications addresses (e.g., "9-1-1," a user-identified emergency communications address, such as a telephone number or an electronic communications address associated with a medical care provider, and so on) stored in an emergency communications profile to determine if the communications address matches an emergency communications address. If the communications address matches an emergency communications address, then the emergency communication module activates the positioning system to determine the location co-ordinates and to associate these co-ordinates and other information (e.g., associated emergency data such as medical data, identification of an owner or user of the VoIP communications device, a visual image captured by the VoIP communications device, and the voice/data communications signal for communication between the user of the VoIP device and a party at the emergency communications address) with an emergency communications signal. Thereafter, the emergency communications signal is communicated with a communications network for routing and otherwise for processing to the emergency communications address, or alternatively, to a PSAP associated with the emergency communications signal. According to embodiments of this invention, the emergency communications signal may be communicated to a telecommunications network that detects and decodes the emergency communications signal to access and to analyze the location co-ordinates with a database of one or more emergency service providers (e.g., a call center of a PSAP that dispatches and/or consults with police, fire, medical, and other emergency response personnel that provide emergency services for a geographic service area) to route the emergency communications signal. Alternate embodiments allow the user to program an emergency communications address that is not registered/identified for emergency assistance by the Federal Communications Commission. For example, the user may select a phone number to his/her doctor's office as an emergency communications address. According to further embodiments, the emergency communications signal may include emergency data (and/or a communications link to emergency data) so that a party receiving the routed emergency communications signal (e.g., a call center of the PSAP) can use and/or access the emergency data and communicate the emergency data to personnel responding to the emergency (e.g., the emergency service provider, a nurse at a called doctor's office, and others).

Referring now to the figures, FIG. 1 illustrates an operating system according to embodiments of this invention. FIG. 1 is a block diagram showing the emergency communications module 110 residing in a computer system shown as VoIP communications device 100. As FIG. 1 shows, the emergency communications module 110 operates within a system memory device. The emergency communications module 110, for example, is shown residing in a memory subsystem 114. The emergency communications module 110, however, could also reside in flash memory 126 or a peripheral storage device 116. The VoIP communications device 100 also has one or more central processors 102 executing an operating system. The operating system, as is well known in the art, has a set of instructions that control the internal functions of the VoIP communications device 100. A Communications ("Comm") Device Interface 150 communicates signals, such as an emergency communications signal (shown in as reference number 242 in FIGS. 2-6), data signals, control signals, and address signals, between the central processor 102 and a system controller 108 (typically called a "Northbridge"). Additionally, the Comm Device Interface 150 has a means to communicate a communications signal (such an emergency communications signal shown as reference numeral 242 in FIGS. 2-6) between the VoIP communications device 100 and a communications network (such as a data network shown as reference number 210 in FIGS. 2, 3, 5, and 6 and a telecommunications network shown as reference number 220 in FIGS. 2-6).

The system controller 108 provides a bridging function between the one or more central processors 102, a graphics subsystem 106, a keyboard subsystem 136, an audio subsystem 112, the memory subsystem 114, a PCI (Peripheral Controller Interface) bus 142, and a Communications ("Comm") Device Interface 150. The PCI bus 142 is controlled by a Peripheral Bus Controller 124. The Peripheral Bus Controller 124 (typically called a "Southbridge") is an integrated circuit that serves as an input/output hub for a location positioning system shown as a Global Positioning System (GPS) 120 and for various peripheral ports and/or transceivers. These peripheral ports allow the VoIP communications device 100 to communicate with a variety of devices through networking ports (such as SCSI or Ethernet) and/or transceivers that include Wireless Communications ("Comm") Device Transceiver 126 (for communication of any frequency signal in the electromagnetic spectrum, such as, for example, Wireless 802.11 and Infrared) and Wired Communications ("Comm") Device Port/Connection 128 (such as modem V90+ and compact flash slots). These peripheral ports could also include other networking ports, such as, a serial port (not shown) and/or a parallel port (not shown). The Comm Device Interface 150 allows the VoIP communications device 100 to monitor, detect, receive, and decode incoming communications signals to the communications device(s) connected to the Wireless Comm Device Transceiver 126 and/or the Wired Comm Device Port/Connection 128. Further, the Comm Device Interface 150 transmits a communications signal (such as emergency communications signal 242 of FIGS. 2-6) to the Wireless Comm Device Transceiver 126 and/or the Wired Comm Device Port/Connection 128. Still further, the VoIP communications device 100 may include a power source 160, such as a rechargeable battery to provide power and allow the VoIP communications device 100 to be portable. In alternate embodiments, the location position system may be an alternative position locating system known by those of ordinary skill in the art. Additionally, those of ordinary skill in the art understand that the program, processes, methods, and systems described in this patent are not limited to any particular computer system or computer hardware.

Those of ordinary skill in the art also understand the central processor 102 is typically a microprocessor. Advanced Micro Devices, Inc., for example, manufactures a full line of ATHLON™ microprocessors (ATHLON™ is a trademark of Advanced Micro Devices, Inc., One AMD Place, P.O. Box 3453, Sunnyvale, Calif. 94088-3453, 408.732.2400, 800.538.8450, www.amd.com). The Intel Corporation also manufactures a family of X86 and P86 microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, Ill. 60196, www.Motorola.com), International Business Machines Corp. (New Orchard Road, Armonk, N.Y. 10504, (914) 499-1900, www.ibm.com), and Transmeta Corp. (3940 Freedom Circle, Santa Clara, Calif. 95054, www.transmeta.com). Those skilled in the art further understand that the program, processes, methods, and systems described in this patent are not limited to any particular manufacturer's central processor.

The operating system may be a UNIX® operating system (UNIX® is a registered trademark of the Open Source Group, www.opensource.org). Other UNIX-based operating systems, however, are also suitable, such as LINUX® or a RED HAT® LINUX-based system (LINUX® is a registered trademark of Linus Torvalds, and RED HAT® is a registered trademark of Red Hat, Inc., Research Triangle Park, North Carolina, 1-888-733-4281, www.redhat.com). Other operating systems, however, are also suitable. Such other operating systems would include a WINDOWS-based operating system (WINDOWS® is a registered trademark of Microsoft Corporation, One Microsoft Way, Redmond Wash. 98052-6399, 425.882.8080, www.microsoft.com) and Mac® OS (Mac® is a registered trademark of Apple Computer, Inc., 1 Infinite Loop, Cupertino, Calif. 95014, 408.996.1010, www.apple.com). Those of ordinary skill in the art again understand that the program, processes, methods, and systems described in this patent are not limited to any particular operating system.

The system memory device (shown as memory subsystem 114 and/or peripheral storage device 116) may also contain an application program. The application program cooperates with the operating system and with a display unit to provide a Graphical User Interface (GUI). The Graphical User Interface typically allows a user to input a combination of signals (such as signals communicated from the audio subsystem 112, graphics subsystem 106, and/or keyboard subsystem 136 and/or alternative input devices). The Graphical User Interface provides a convenient visual and/or audible interface with the user of the VoIP communications device 100.

Figure 2:
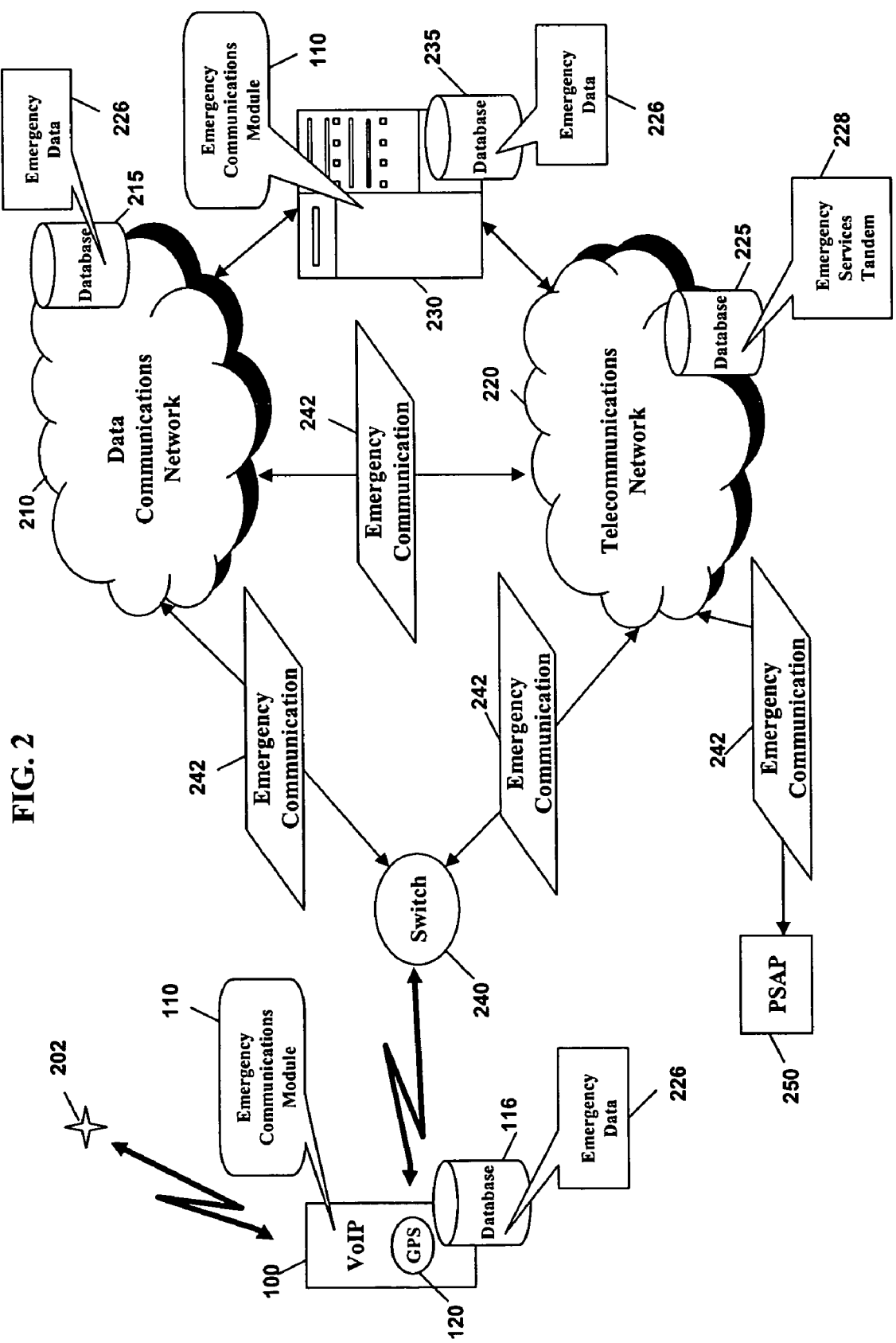
FIG. 2 illustrates an operating environment for providing emergency communications over one or more communications networks according to the embodiments of this invention.

As shown in FIG. 2, an emergency communications system 200 includes the VoIP communications device 100 operating in a wireless mode, the emergency communications module 110 residing in the database 116 with emergency data 226, an emergency communications signal 242, a voice/data communications switch 240, emergency communications signal 242, a data communications network 210 including a database 215 with emergency data 226, a remote server 230 including the emergency communications module 110 and a database 235 with emergency data 226, a telecommunications network 220 having a server/database 225 with emergency service tandem data 228, and an emergency communications address shown as a call center for PSAP 250 (also referred to as "PSAP"). According to embodiments of this invention, the emergency communications module 110 analyzes an outgoing communications addresses (e.g., a dialed phone number, an IP address, an email address, and other communications addresses) of the VoIP communications device 100 to determine if the outgoing communications address is an emergency communications address, that is, a communications address for requesting an emergency service. For example, if a user of the VoIP communications device 100 dials "9-1-1" from keyboard subsystem 136, then the emergency communications module 110 would detect the outgoing communications address and compare the outgoing communications address with a database of emergency communication addresses for a match. In this case, the communications address "9-1-1" matches an emergency communications address of "9-1-1" used as a standard national phone number for emergency services. However, according to further embodiments of this invention, the user may identify other emergency communications addresses, such as, for example a physician's phone number, a police department's phone number, an emergency Internet Protocol web address, and/or another communications address entered by the user into the emergency communications module 110. Once the emergency communications address is identified, the emergency communications module 110 associates an emergency communications profile and activates the GPS 120 to determine location co-ordinates of the VoIP communications device 100. The emergency communications profile may include the matched emergency communications address, associated emergency communications addresses (e.g., if "9-1-1" is matched, then also associate Dr. Smith's communications address to communicate the emergency communications signal), emergency data (e.g., medical information, personal information, and other information), and/or a communications link for accessing remotely stored emergency data (e.g., an emergency data communications address of a remote database). The emergency communications module 110 associates and analyzes the location co-ordinates and the emergency communications profile to generate an emergency communications signal 242 that includes the communications signal (e.g., the voice and/or data signal), the emergency communications address(es), the location co-ordinates, the emergency data, and/or the communications link to the remotely stored emergency data (also referred to as the "emergency data communications address"). Thereafter, the emergency communications signal 242 is communicated to the communications switch 240 for routing to the telecommunications network 220 and/or to the data communications network 210 that analyzes the emergency communications signal 242 for routing and/or further processing. For example, if the telecommunications network 220 detects an emergency communications address of "9-1-1-," then the telecommunications network 220 matches the location co-ordinates of the emergency communications signal 242 with the database 225 of emergency services tandems to select a PSAP 250 and connects the emergency communications signal with the selected PSAP 250. "9-1-1" and enhanced "9-1-1" services including selection of the PSAP are well known in the art, and therefore, will not be further explained. If, however, the telecommunications network 220 detects a user-defined, non-registered emergency communications address (i.e., a communications address not associated with a national, state, local, or other governmental identified emergency communications address for emergency services), then the telecommunications network 220 processes the emergency communication signal for communication with the emergency communications address. The communications switch 240 may include Advanced Intelligent Network (AIN) componentry controlling many features of the communications with the telecommunications network 220. In addition, the communications switch 240 may include a packet-based "softswitch" that uses software control to provide voice, data, and video services by dynamically changing its connection data rates and protocols types. In this case, an application server (not shown) interfaces with the softswitch via a packet protocol, such as Session Initiation Protocol (SIP). The signaling between the voice/data switch 240, the telecommunications network 220, and/or the data network 210, however, is well understood in the art and will not be further described.

When establishing the emergency communications profile for each emergency communications address, the user may interact with a GUI of the emergency communications module 110 to input and/or to select the emergency communications address (e.g., to input a doctor's phone number to define as an emergency communications address), emergency data, and an associated emergency data communications address to communicate with the emergency communications signal. Alternatively, the emergency communications profile may contain default parameters, such as a database of registered national, state, local, and/or other governmental emergency communications addresses, emergency data related to an owner of the VoIP communications device 100 such as a home address, name, and financial information, and emergency data communications address associated with a history of communications links matching key words such as "doctor," "medical," "emergency contact," and others. The emergency data may include any information that the user inputs and/or selects to communicate with the emergency communications signal, and may include such data as a phone number for an emergency contact, name of user, name of owner, addresses, medical information and instructions such as known allergies and current medications, legal information (e.g., instructions to not resuscitate), security information such as user identifications and passwords, and other emergency information. The emergency data may include audio files, pictures, charts, data files, or any other electronic data that augments, explains, and/or accompanies the emergency communication (e.g., a telephone conversation of the emergency communications signal). For example, as the user and the party (i.e., the party answering the incoming emergency communications signal 242) converse via the telephone connection, the party may simultaneously view or listen to this emergency data.

When the telecommunications network 220 detects the emergency communications signal 242 and decodes it to identify the emergency data communications address for accessing remote emergency data, the telecommunications network 220 may communicate the emergency data communications address with the emergency communications signal 242 or, alternatively, may access the emergency data communications address to push the remotely stored emergency data to the emergency communications address. According to the embodiments shown in FIG. 2, if the emergency communications address is an address of the data network 210, then the telecommunications network 220 may access the database 215 to retrieve and/or bundle the emergency data 226 for more direct communication of the emergency data 226 from the telecommunications network 220 to the emergency communications address shown as the PSAP 250. Similarly, the telecommunications network 220 may access the database 235 of server 230 to retrieve and/or bundle the emergency data 226 for more direct communication to PSAP 250. If, however, the emergency data 226 is locally stored on database 116 of the VoIP communications device 100, then the emergency data is communicated from the VoIP communications device 100 to the telecommunications network 220. Some of the emergency data may be stored on the database 116 of the VoIP communications device and some of the emergency data may be remotely stored.

Because the VoIP communications device 100 of FIG. 2 operates in a wireless environment, the VoIP communications device 100 may originate a communications signal from any location having access to a communications network. For example, the user may initiate a communications signal from the VoIP communications device 100 in one location, but then, as the user moves about (or if the VoIP communications device 100 is moved by another means) during a communications connection, the location of the VoIP communications device 100 changes. An advantage of this invention is to pinpoint location co-ordinates and communicate these co-ordinates to the emergency service personnel responding to the emergency communications. According to an embodiment, the Emergency Communications Module 110 refreshes the location co-ordinates according to a selected time interval (such as, for example, at least every fifteen (15) seconds) and communicates the updated location co-ordinates with the emergency communications signal 242. While the initial location co-ordinates are used by the telecommunications network 220 to select the call center of PSAP 250 having a proximate geographic location (i.e., the service area of call center of PSAP 250 is matched to the location co-ordinates initially transmitted with the emergency communications signal 242), the updated location co-ordinates are communicated to PSAP 250, and if helpful, PSAP 250 may communicate these updated co-ordinates to the responding emergency personnel. An example might be when the user of VoIP communications device 100 calls "9-1-1" from a burning building to request help. The user may initiate the emergency communications signal 242 from a third floor of the building, and in an attempt to exit the building, the user may change his location to another floor. If the emergency response personnel try to locate the user, these updated co-ordinates may provide more precise information on the user's proximate location (if the user still has the VoIP communications device 100).

Figure 3:
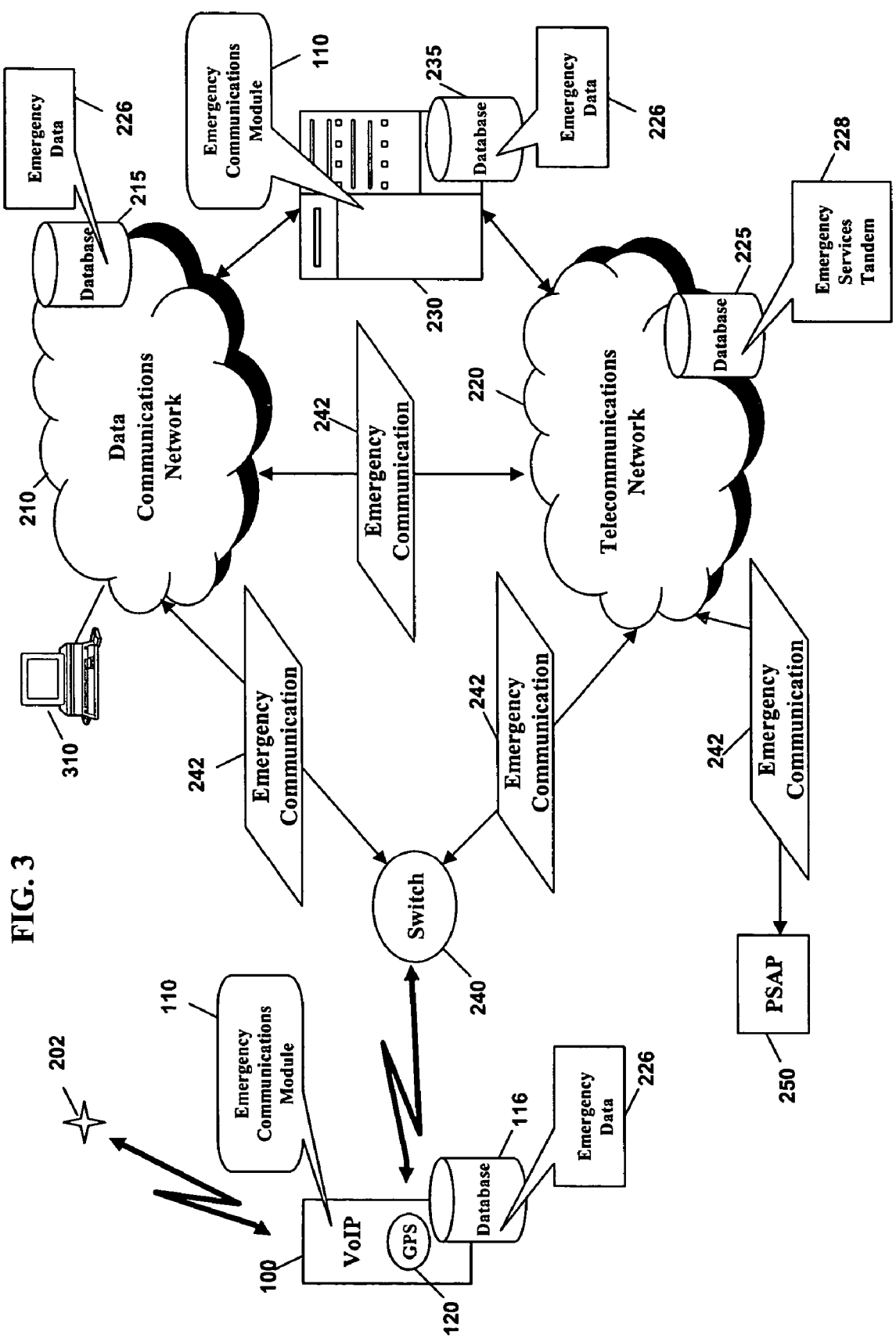
FIG. 3 illustrates another operating environment for providing emergency communications according to the embodiments of this invention.

FIG. 3 illustrates an emergency communications system 300 similar to the emergency communications system 200 of FIG. 2; however, the emergency communications system 300 further includes personal computer 310 connected with the data network 210. The personal computer 310 offers a convenient interface for the user to establish the emergency communications profile of the emergency communications module 110 operating on VoIP communications device 100. Still further, the personal computer 310 may have an associated Internet Protocol (IP) emergency data communications address of emergency data 226 that may be accessed and retrieved over the communications connection with the data network 210 for communication with the emergency communications signal. Still further, the personal computer 310 may originate a request for emergency services and communicate the emergency communications signal to the data network 210 for routing and/or other processing such as to the telecommunications network 220 for selection and communication to the PSAP 250.

Figure 4:
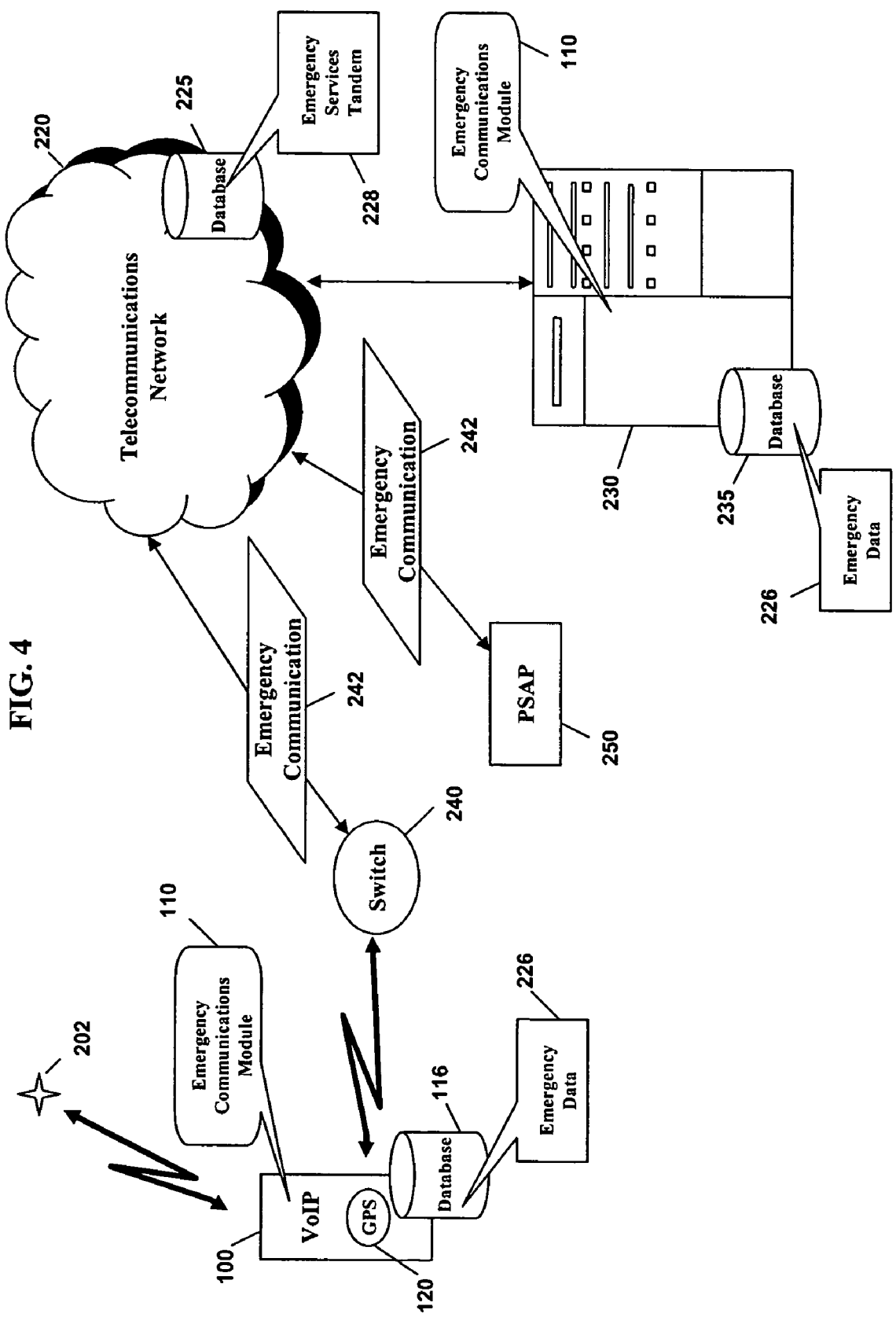
FIG. 4 illustrates yet another operating environment for providing emergency communications over a telecommunications network according to the embodiments of this invention.

FIG. 4 illustrates another emergency communications system 400 similar to the emergency communications system 200 of FIG. 2; however, emergency communications system 400 does not include the data network 210 nor does it include that database 215. Rather FIG. 4, illustrates the VoIP communications device 100 communicating the emergency communication signal 242 to the voice/data switch 240 for communication to the telecommunications network 220 for routing and/or further processing. According to these embodiments, the emergency data 226 may be stored in the database 116 of VoIP communications device's 100 and/or in the database 235 of remote server 230. That is, the switch 240 detects and decodes the emergency communications signal 242 to determine that the emergency communications address(es) is a telecommunications address (e.g., a phone number) and that the emergency data 226 is communicated with the emergency communications signal 242 or is accessible by the telecommunications network 220 to the database 235 of the remote server (or, alternatively, to a database (not shown) of the telecommunications network 220). Thus, the voice/data switch 240 does not communicate the emergency communications signal 242 to the data network 210. Similar embodiments exist if the emergency communications address and/or the emergency data communications address are not communications addresses of the telecommunications network 220. That is, if the voice/data switch 240 detected and decoded the emergency communications signal 242 to identify the emergency communication address and/or the emergency data communications address having only an electronic communications address(es) (e.g., a web-based address, an email, an IP address, an address associated with database 235 of remote server 230, and so on), and not a telecommunications address, then the switch 240 may route the emergency communications signal 242 to the data network 210 and may not communicate with the telecommunications network 220.

Figure 5:
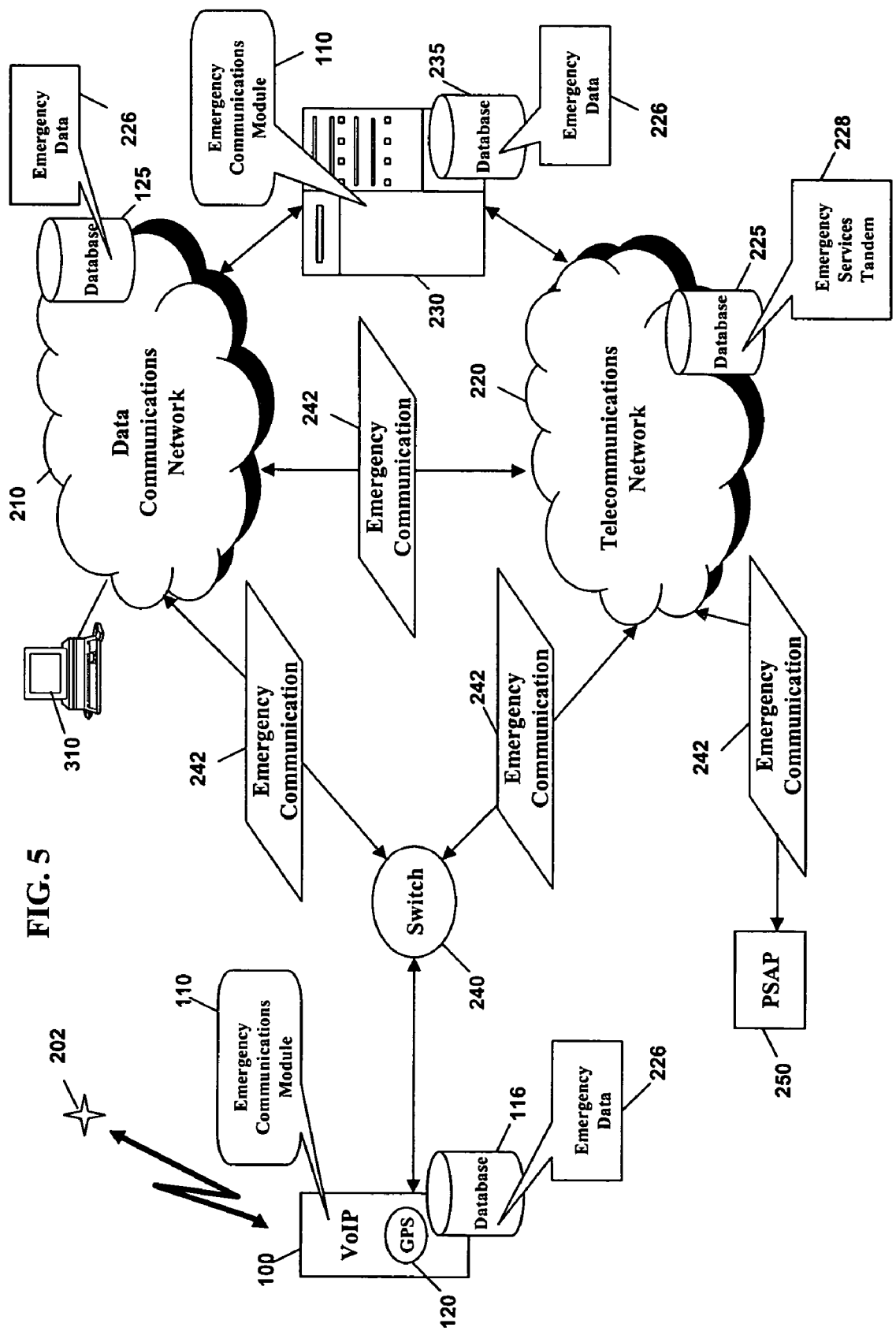
FIG. 5 further illustrates yet another operating environment for providing emergency communications according to the embodiments of this invention.

FIG. 5 illustrates an emergency communications system 500 similar to the emergency communications system 200 of FIG. 2; however, emergency communications system 500 illustrates the VoIP communications device 100 having a wired connection to the switch 240. The wire connection includes a wired communications device port 144 of the VoIP communications device 100 coupled via a communications wire (e.g., copper, optical fiber, coaxial cable, and others) with a communications outlet (not shown) such as with a direct network outlet/port or with a port (e.g., serial port, parallel port, Universal Serial Port (USP), and/or others) of a networked computing unit (e.g., a personal computer, a digital signal processor, and other wired network devices communicating with the switch 240). According to the embodiments, the VoIP communications device 100 has the ability to use the wired connection at a variety of different locations such as a location where a router isn't available for wireless communications or an area with interference or weak signal strength. When the wired connection is used for communications between the VoIP communications device 100 and the telecommunications network 220 and/or the data network 210, the emergency communications module 110 works similar to the above embodiments to determine the actual location co-ordinates of the VoIP communications device 100 for communication with the emergency communications signal 242. For example, if the user plugs the VoIP communications device 100 into a parallel port of another computing device, the location co-ordinates of the VoIP communications device 100 are determined and communicated with the emergency communications signal 242. Because the location co-ordinates are determined when the emergency communications address is detected, these location co-ordinates are more up-to-date and reliable than location co-ordinates that may be associated with the connected (via parallel port) computing device.

Figure 6:
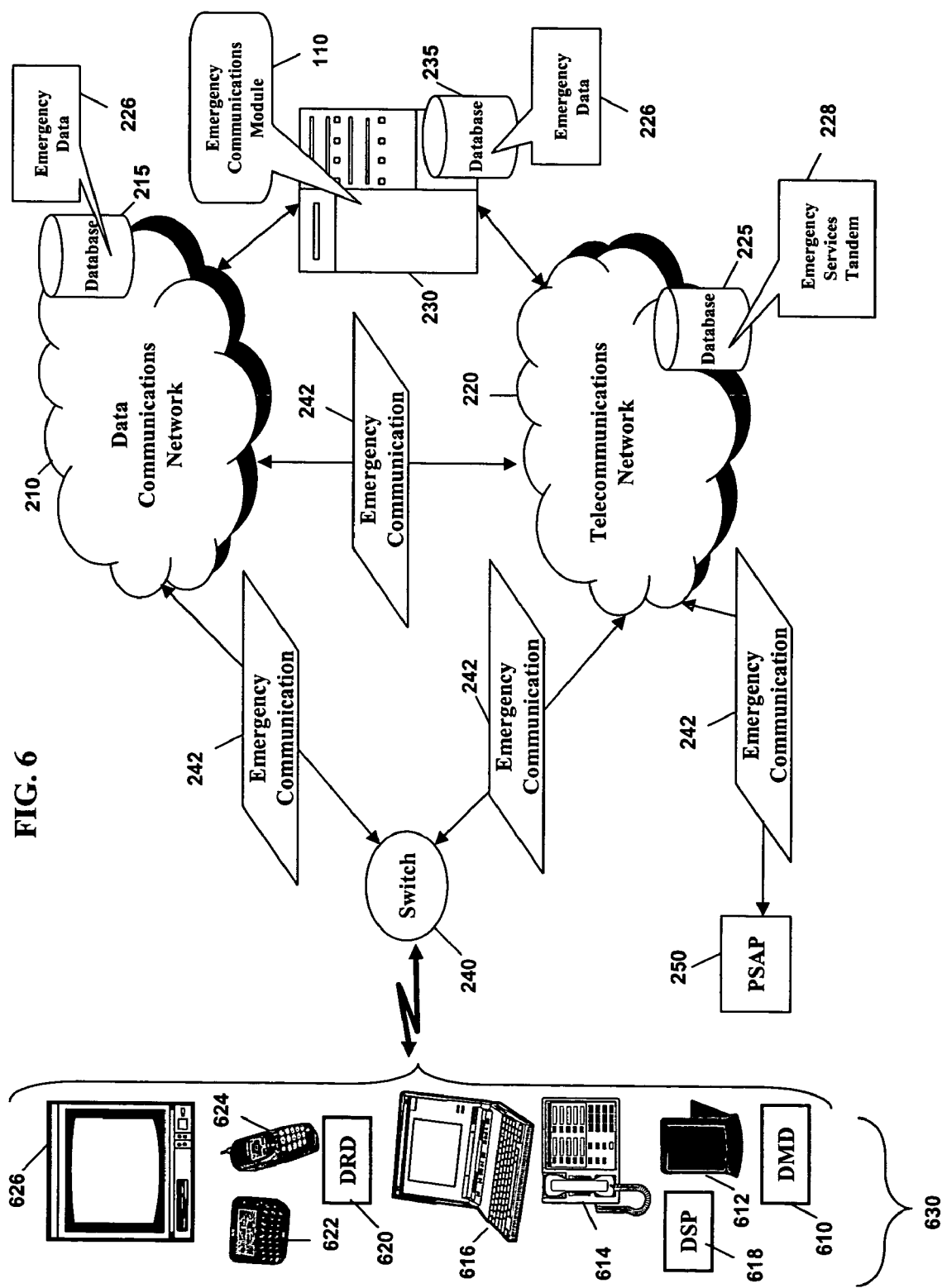
FIG. 6 illustrates alternative communication devices for providing emergency communications over one or more communications networks according to the embodiments of this invention.

FIG. 6 illustrates another emergency communications system 600 similar to the emergency communications system 200 of FIG. 2; however, the emergency communications system 600 illustrates various alternate communication devices 630 (each having the emergency communications module 110 (not shown)) that may be used instead of the VoIP communications device 100 for communicating the emergency communications signal 242 to the telecommunications network 220 and/or the data communications network 210. The various alternate communication devices 630 include a digital music device (DMD) 610, a personal digital assistant 612, a computer system 616, a digital signal processor (DSP) 618, a digital recording device (DRD) 620, a wireless communications device 624, and an interactive television 626.

The term "processing," as used herein, encompasses every event from the time the user inputs or selects a communications address (including an emergency communications address0 with the VoIP communications device 100 (or alternate communications devices 630) to the termination of the communication with the communications address. "Processing" of the emergency communications signal 242 includes routing a voice path and signaling setup and intelligence (e.g., Local Number Portability queries, queries to retrieve Calling Name/Number information, AIN queries, IP queries, standard signaling messages to determine call routing paths, and others). The term "processing" also includes monitoring an established connection between the VoIP communications device 100 and the emergency communications address (e.g., the PSAP 250 shown in FIGS. 2-6) for possible DTMF entry, switch hook flash, other events that indicate a party has requested something, and delivery of emergency data. "Processing," may further encompass billing activities and measurements at a switch or other network element.

Figure 7:
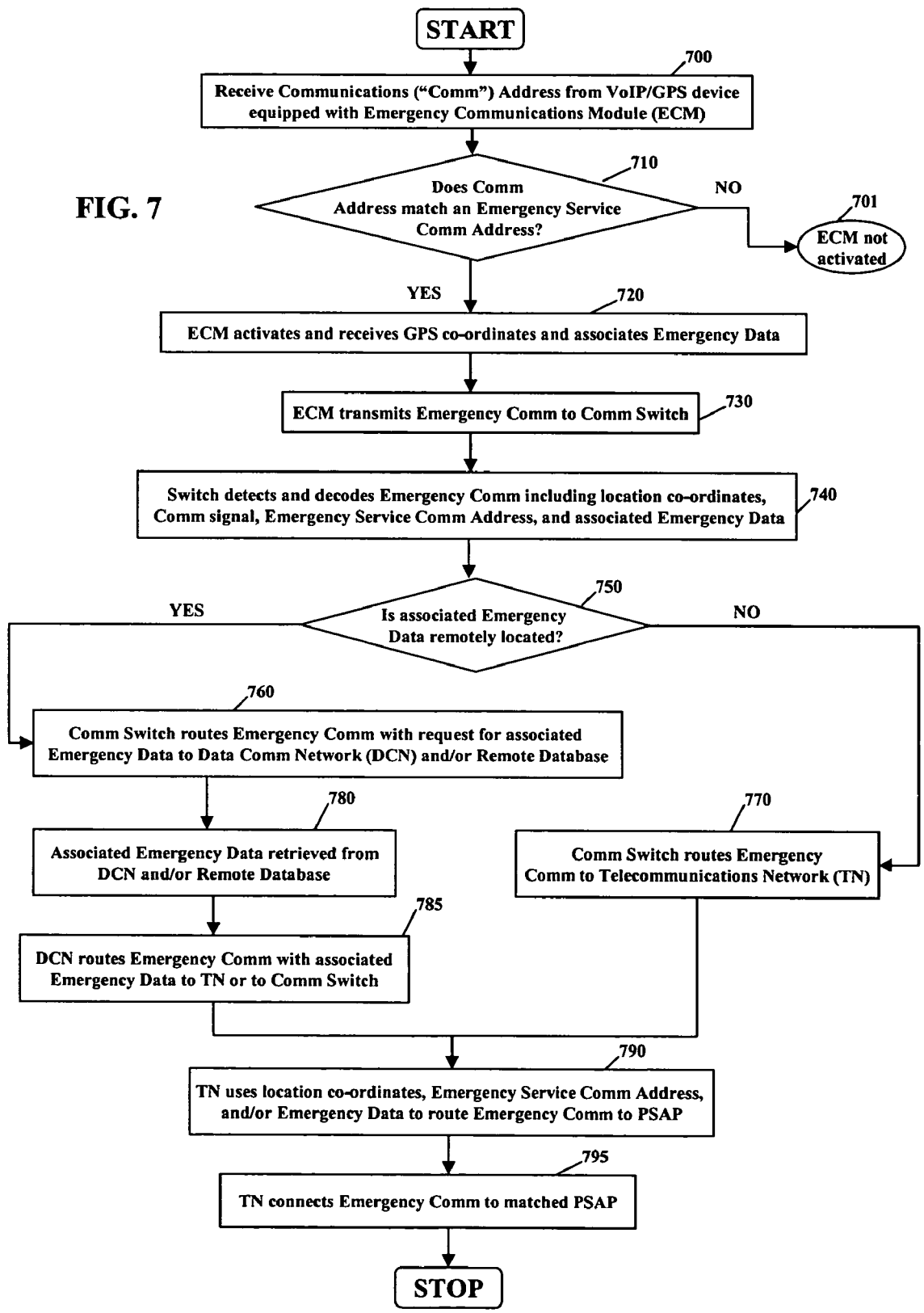
FIG. 7 is a flowchart illustrating a method for providing emergency communications according to the embodiments of this invention.
Figure 8:
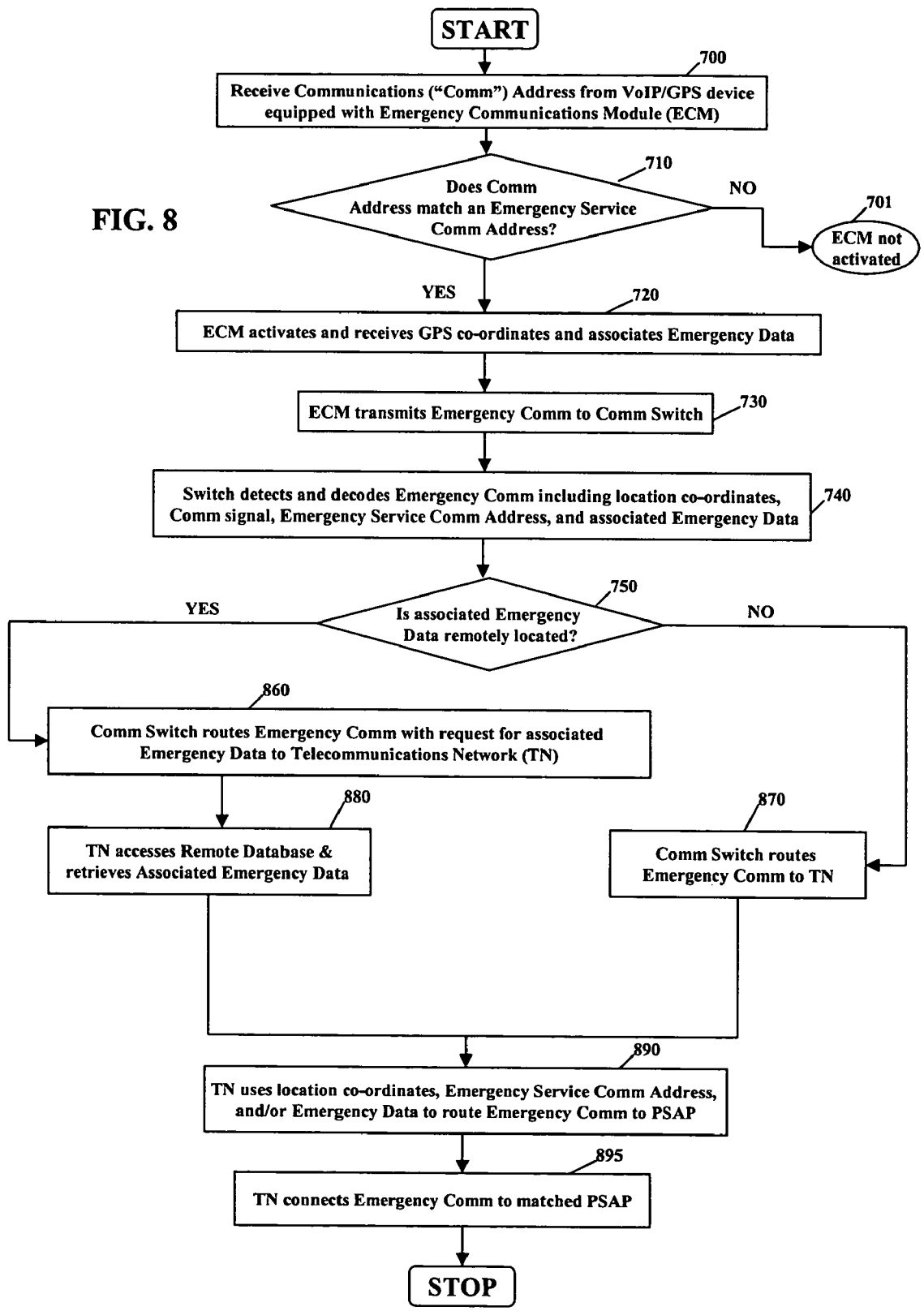
FIG. 8 is a flowchart illustrating another method for providing emergency communications according to the embodiments of this invention.

FIGS. 7-8 are flowcharts showing processes of providing emergency communications according to embodiments of this invention. A GPS and emergency communications module equipped VoIP communications device receives a communications address [block 700]. If the communications address does not match an emergency communications address [block 710], then the emergency communications module is not activated [block 701]. If the communications address does match an emergency communications address [block 710], then the emergency communications module is activated and receives GPS location co-ordinates and associates emergency data [block 720]. The emergency communications module then transmits emergency communications to the communications switch [block 730]. The switch then detects and decodes emergency communications including location co-ordinates, communication signal, emergency service communication address, and associated emergency data [block 740]. If the emergency data IS NOT remotely located [block 750] then the communications switch routes emergency communications to the telecommunications network [block 770]. The telecommunications network then uses the location co-ordinates, emergency service communications address, and/or emergency data to route emergency communications to the PSAP [block 790]. The telecommunications network connects emergency communications to the matched PSAP [block 795]. If the associated emergency data is remotely located [block 750], then the communications switch routes emergency communications with a request for associated emergency data to the data communications network and/or the remote database [block 760]. Then the associated emergency data is retrieved from the data communications network and/or the remote database [block 780]. The data communications network then routes emergency communications with associated emergency data to the telecommunications network or to the communications switch [block 785]. The telecommunications network uses location co-ordinates, emergency service communications address, and/or emergency data to route emergency communications to the PSAP [block 790]. The telecommunications network then connects emergency communications to the matched PSAP [block 795].

FIG. 8 illustrates a flowchart of another method for providing emergency communications according to the embodiments of this invention. A GPS and emergency communications module equipped VoIP communications device receives a communications address (e.g., 911) [block 700]. If the communications address does not match an emergency communications address [block 710], then the emergency communications module is not activated [block 701. If the communications address does match an emergency communications address [block 710], then the emergency communications module is activated and receives GPS location co-ordinates and associates emergency data [block 720]. The emergency communications module then transmits emergency communications to the communications switch [block 730]. The switch then detects and decodes emergency communications including location co-ordinates, communication signal, emergency service communication address, and associated emergency data [block 740]. If the emergency data is not remotely located [block 750] then the communications switch routes emergency communications to the telecommunications network [block 870]. The telecommunications network then uses the location co-ordinates, emergency service communications address, and/or emergency data to route emergency communications to the PSAP [block 890]. The telecommunications network connects emergency communications to the matched PSAP [block 895]. If the associated emergency data is remotely located [block 750] then the communications switch routes emergency communications with a request for associated emergency data to telecommunications network [block 860]. Then the telecommunications network accesses a remote database and retrieves associated emergency data [block 880]. The telecommunications network uses location co-ordinates, emergency service communications address, and/or emergency data to route emergency communications to the PSAP [block 890]. The telecommunications network then connects emergency communications to the matched PSAP [block 895].

The emergency communications module (shown as reference numeral 110 in FIGS. 1-6) may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com. This computer-readable medium, or media, could be distributed to end-users, licensees, and assignees. These types of computer-readable media, and other types not mention here but considered within the scope of the present invention, allow the emergency communications module to be easily disseminated.

The emergency communications module may be physically embodied on or in any addressable (e.g., HTTP, I.E.E.E. 802.11, Wireless Application Protocol (WAP)) wireless device capable of presenting an IP address. Examples could include a computer, a wireless personal digital assistant (PDA), an Internet Protocol phone, or a wireless pager.

While this invention has been described with respect to various features, aspects, and embodiments, those skilled and unskilled in the art will recognize this invention is not so limited. Other variations, modifications, and alternative embodiments may be made without departing from the spirit and scope of this invention.

What is claimed is:

1. A method, comprising the following steps:
    receiving a communications address from a voice-over internet protocol communications device;
    responsive to receiving the communications address, associating the communications address with a database of multiple user identified emergency communications addresses to determine if the communications address is a user identified emergency communications address;
    if the communications address is a user identified emergency communications address, then:
        using a positioning system to determine the location co-ordinates of the voice-over internet protocol communications device,
        associating the location co-ordinates and an emergency communications profile with an emergency communications signal of the voice-over internet protocol communications device, the emergency communications profile comprises (1) emergency data, (2) an emergency data communications address for accessing the emergency data, and (3) at least one emergency communications address,
        assessing the emergency data communications address and associating the emergency data with the emergency communications signal,
        communicating the emergency communications signal to at least one communications network, wherein the communications network detects, decodes, and matches the location co-ordinates to a public safety access provider for the user identified emergency communications address,
        connecting the emergency communications signal to the public safety answering point of the user identified emergency communications address,
        updating the location co-ordinates, and
        communicating the updated co-ordinates to the public safety answering point of the emergency communications address,
    wherein connecting the emergency communications signal to the public safety answering point of the user identified emergency communications address comprises connecting the emergency communications signal to an emergency internet protocol communications address of the public safety answering point.

2. A method according to claim 1, wherein the step of communicating the emergency communications signal to at least one communications network comprises communicating the emergency communications signal to a telecommunications network.

3. A method according to claim 1, wherein the step of communicating the emergency communications signal to at least one communications network comprises communicating the emergency communications signal to a data network.

4. A method according to claim 1, wherein the step of connecting the emergency communications signal to the public safety answering point of the user identified emergency communications address comprises connecting the emergency communications signal to an emergency telephonic communications address of the public safety answering point.

5. A method according to claim 1, wherein the voice-over internet protocol device comprises at least one of a wireless communications device, a voice-over internet protocol phone, a computer, a digital recording device, a personal digital assistant, an interactive television, and a digital signal processor.

6. A method according to claim 1, wherein the step of accessing the emergency data communications address and associating the emergency data with the emergency communications signal comprises accessing a remote database and associating the emergency data stored on the remote database with the emergency communications signal.

7. A method according to claim 1, further comprising the steps of:
    if the emergency data is stored in a remote database, then associating the emergency communications signal with a communications link to access and retrieve the emergency data,
    accessing and retrieving the remotely stored emergency data and associating the remotely stored emergency data with the emergency communications signal.

8. A communications system, comprising:
    a communications device having a position locating system and an emergency communications module stored in memory, the emergency communications module accessing a database of a plurality of emergency communications profiles responsive to receiving a communications address from a voice-over internet protocol communications device, wherein the emergency communications profile comprises (1) an emergency communications address, (2) emergency data, and (3) an emergency data communications address for accessing the emergency data; and
    a communications interface having the means to communicate an emergency communication signal between the communications device and a communications network, wherein the emergency communication signal comprises (1) one location co-ordinate of the position locating system, (2) an emergency service communications address, (3) a communications signal, (4) the emergency data, (5) the emergency data communications address for accessing the emergency data, and (6) an updated location co-ordinate of the position locating system and means to connect the emergency communication signal to the public safety answering point of the emergency communications address by connecting the emergency communications signal to an emergency internet protocol communications address of the public safety answering point,
    wherein the database of emergency communications profiles includes at least one user identified communications address.

9. The communications system of claim 8, further comprising:
    the communications network having the means to analyze the emergency communications signal to select a public safety answering point, and further having means to communicate the emergency communications signal to the selected public safety answering point.

10. The communications system of claim 8, wherein the communications interface comprises a voice and data switch, the voice and data switch establishing a communications connection with at least one of a telecommunications network and a data network.

11. The communications system of claim 10, the data network further communicating the emergency communications signal with the telecommunications network, 12. The communications system of claim 10, the telecommunications network further communicating the emergency communications signal with the data network.

13. The communications system of claim 8, wherein the communications interface comprise at least one of a wireless communications transceiver and a wired communications port.

14. The communications system of claim 13, wherein the wireless communications interface communicates communications signals, the communications signals comprising at least one of: voice-over internet protocol telephone frequencies, cellular telephone frequencies, satellite telephone frequencies, 2.4-2.5 GHz, infrared frequencies.

15. The communications system of claim 13, wherein the wireless communications interface communicates communications signals, the communications signals further comprising any frequency signal in the electromagnetic spectrum.

16. A computer program product, comprising:
    a computer-readable medium; and
        an emergency communications module stored on the computer-readable medium, the emergency communications module detecting an emergency communications address, activating a positioning system to determine location co-ordinates, associating the location co-ordinates and an emergency communications profile with an emergency communications signal, communicating the emergency communications signal to at least one communications network, connecting the emergency communications signal to the public safety answering point of the emergency communications address by connecting the emergency communications signal to an emergency internet protocol communications address of the public safety answering point, updating the location co-ordinates, and communicating the updated co-ordinates to the public safety answering point of the emergency communications address,
    wherein the emergency communications address comprises a user identified emergency communications address, and
    wherein detecting the emergency communications address comprises:
        receiving a communications address from a voice-over internet protocol communications device; and
        responsive to receiving the communications address, associating the communications address with a database of multiple user identified emergency communications addresses to determine if the communications address is a user identified emergency communications address.

17. The computer program product of claim 16, wherein the computer-readable medium is stored in a voice-over internet protocol wireless communications device.

18. The computer program product of claim 16, wherein the computer-readable medium is stored in a computer system.

19. The computer program product of claim 16, wherein the user identified emergency communications address comprises at least one of a physician's address data.

* * * * *